(12) United States Patent
Scantlen et al.

(10) Patent No.: US 8,817,030 B2
(45) Date of Patent: Aug. 26, 2014

(54) GPGPU SYSTEMS AND SERVICES

(75) Inventors: Greg Scantlen, Albuquerque, NM (US); Gary Scantlen, Albuquerque, NM (US)

(73) Assignee: CreativeC LLC, Albuquerque, NM (US)

( * ) Notice: Subject to any disclaimer, the term of this patent is extended or adjusted under 35 U.S.C. 154(b) by 463 days.

(21) Appl. No.: 12/895,554

(22) Filed: Sep. 30, 2010

(65) Prior Publication Data

US 2011/0074791 A1 Mar. 31, 2011

Related U.S. Application Data

(60) Provisional application No. 61/247,237, filed on Sep. 30, 2009, provisional application No. 61/261,973, filed on Nov. 17, 2009.

(51) Int. Cl.
*G06F 15/16* (2006.01)

(52) U.S. Cl.
USPC ............ 345/502; 345/505; 345/503; 718/104

(58) Field of Classification Search
USPC ................................................. 345/502, 503
See application file for complete search history.

(56) References Cited

U.S. PATENT DOCUMENTS

| | | | |
|---|---|---|---|
| 7,975,001 B1 * | 7/2011 | Stefansson et al. | ............ 709/203 |
| 2009/0182605 A1 * | 7/2009 | Lappas et al. | .................... 705/8 |

OTHER PUBLICATIONS

Volodymyr V. Kindratenko, Jeremy J. Enos, Guochun Shi, Michael T. Showerman, Galen W. Arnold #1, John E. Stone, James C. Phillips, Wen-mei Hwu, "GPU Clusters for High-Performance Computing", Aug. 31, 2009-Sep. 4, 2009, IEEE, Cluster Computing and Workshops, 2009. Cluster '09, 1-8.*

Daniel Nurmi, Rich Wolski, Chris Grzegorczyk, Graziano Obertelli, Sunil Soman, Lamia Youseff, Dmitrii Zagorodnov, "The Eucalyptus Open-source Cloud-computing System", May 18-21, 2009, IEEE, 9th IEEE/ACM International Symposium on Cluster Computing and the Grid, 124-131.*

Zhe Fan, Feng Qiu, Arie Kaufman, Suzanne Yoakum-Stover, "GPU Cluster for High Performance Computing", Nov. 6-12, 2004, IEEE, ACM / IEEE Supercomputing Conference Nov. 6-12, 2004, Pittsburgh, PA, 1-12.*

* cited by examiner

*Primary Examiner* — Daniel Hajnik
*Assistant Examiner* — Naveed Hasan
(74) *Attorney, Agent, or Firm* — Lewis Roca Rothgerber LLP

(57) ABSTRACT

Graphics processing units (GPUs) deployed in general purpose GPU (GPGPU) units are combined into a GPGPU cluster. Access to the GPGPU cluster is then offered as a service to users who can use their own computers to communicate with the GPGPU cluster. The users develop applications to be run on the cluster and a profiling module tracks the applications' resource utilization and can report it to the user and to a subscription server. The user can examine the report to thereby optimize the application or the cluster's configuration. The subscription server can interpret the report to thereby invoice the user or otherwise govern the users' access to the cluster.

16 Claims, 2 Drawing Sheets

GPGPU SYSTEMS AND SERVICES

CROSS REFERENCE TO RELATED APPLICATIONS

This patent application claims the priority and benefit of U.S. Provisional Patent Application No. 61/247,237 filed Sep. 30, 2009 entitled "High Performance GPU-Based Computing Constellations" and of U.S. Provisional Patent Application No. 61/261,973 filed Nov. 17, 2009 entitled "GPGPU Systems, Methods, Packaging and Configuration". Provisional Patent Applications 61/261,973 and 61/261,973 are herein incorporated by reference.

TECHNICAL FIELD

Embodiments relate to computing clusters, cloud computing, and general purpose computing based on graphic processor units. Embodiments also relate to massive computing power offered on a subscription basis. Embodiments additionally relate to profiling massively parallel programs on a variety of cluster configurations.

BACKGROUND OF THE INVENTION

Massive computing capability has traditionally been provided by highly specialized and very expensive supercomputers. As technology advances, however, inexpensive desktop and server hardware has steadily supplanted expensive high end systems. More recently, inexpensive hardware has been gathered together to form computing clusters. The individual computers in a compute cluster are typically not as expensive or reliable as their supercomputer and mainframe forbearers but overcome those limitations with sheer numbers.

The drawback of compute clusters is that they are difficult to maintain and to program. In order to harness the power of a compute cluster, a program must be split into a great number of pieces and the multitudinous results later reconciled and reassembled. Furthermore, the program itself must be fault tolerant because there is a risk of individual failures amongst the great number of inexpensive computers.

Desktop and gaming computers often conserve central processing unit (CPU) resources by employing a graphics subsystems dedicated to drive one or more computer displays. A graphics processing unit (GPU) is at the heart of the graphics subsystem. The CPU is a general purpose processor designed to efficiently run a great variety of algorithms. Graphics processing, however, consists of a limited and well known set of algorithms. GPUs are specialized processors that are very good at graphics processing but not necessarily good at other tasks.

Another recent development is the identification of algorithms, other than graphics algorithms, that are well suited for GPUs. These algorithms currently require expert programming in order to put them into a form that a GPU can run. Further optimization is required to for a GPU to run the algorithm well. The effort is often worthwhile because the speedup can be orders of magnitude faster. Unfortunately, properly configured computing systems having the software tools required for developing algorithms to run on GPUs are rare. As such, expertise in the required programming techniques is rare and difficult to develop.

Systems and methods for providing GPU powered compute clusters and for deploying non-graphics applications to efficiently run on those GPU powered compute clusters are needed.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore an aspect of the embodiments to provide service granting remote users with access to a general purpose GPU (GPGPU) based compute cluster. The GPGPU cluster consists of a number of GPGPU units. Each GPGPU unit is a self contained computer having an enclosure, CPU, cooling fan, GPU, memory for the CPU and GPU, and a communications interface.

It is another aspect of the embodiments to provide a subscription server module. A user access the subscription server module through the user's own computer. The subscription server module governs the users access to the GPGPU units, related hardware, and related software tools.

The user provides a GPGPU application to be run on the GPGPU cluster. The GPGPU application can be developed by on the user's computer or on the GPGPU cluster itself. The user can obtain the application development tools from the GPGPU cluster, from the entity providing access to the GPGPU cluster, or from another source.

The GPGPU application can be designed to run on a specific configuration of GPGPU units or can otherwise specify a configuration. The GPGPU application has GPU instructions and application data. The GPUs in the GPU units can operate on the application data while executing the GPU instructions. Furthermore, the GPGPU cluster can be interconnected in accordance with the configuration and the GPGPU application then run.

It is a further aspect of the embodiments to provide a profiling module. The profiling module tracks the GPGPU cluster resources consumed by the GPGPU application. The resources can include the number of GPGPU units, the amounts of memory, the amounts of processing time, the numbers of GPU cores, and similar information that the user can interpret to optimize the GPGPU application. The GPGPU application can be optimized by altering the control flow of the instructions, flow of the data, or configuration of the GPGPU cluster.

BRIEF DESCRIPTION OF THE DRAWINGS

The accompanying figures, in which like reference numerals refer to identical or functionally similar elements throughout the separate views and which are incorporated in and form a part of the specification, further illustrate aspects of the embodiments and, together with the background, brief summary, and detailed description serve to explain the principles of the embodiments.

DETAILED DESCRIPTION

The particular values and configurations discussed in these non-limiting examples can be varied and are cited merely to illustrate at least one embodiment and are not intended to limit the scope thereof. In general, the figures are not to scale.

Graphics processing units (GPUs) deployed in general purpose GPU (GPGPU) units are combined into a GPGPU cluster. Access to the GPGPU cluster is then offered as a service to users who can use their own computers to communicate with the GPGPU cluster. The users develop applications to be run on the cluster and a profiling module tracks the applications' resource utilization and can report it to the user and to a subscription server. The user can examine the report to thereby optimize the application or the cluster's configuration. The subscription server can interpret the report to thereby invoice the user or otherwise govern the users' access to the cluster.

Figure 1:
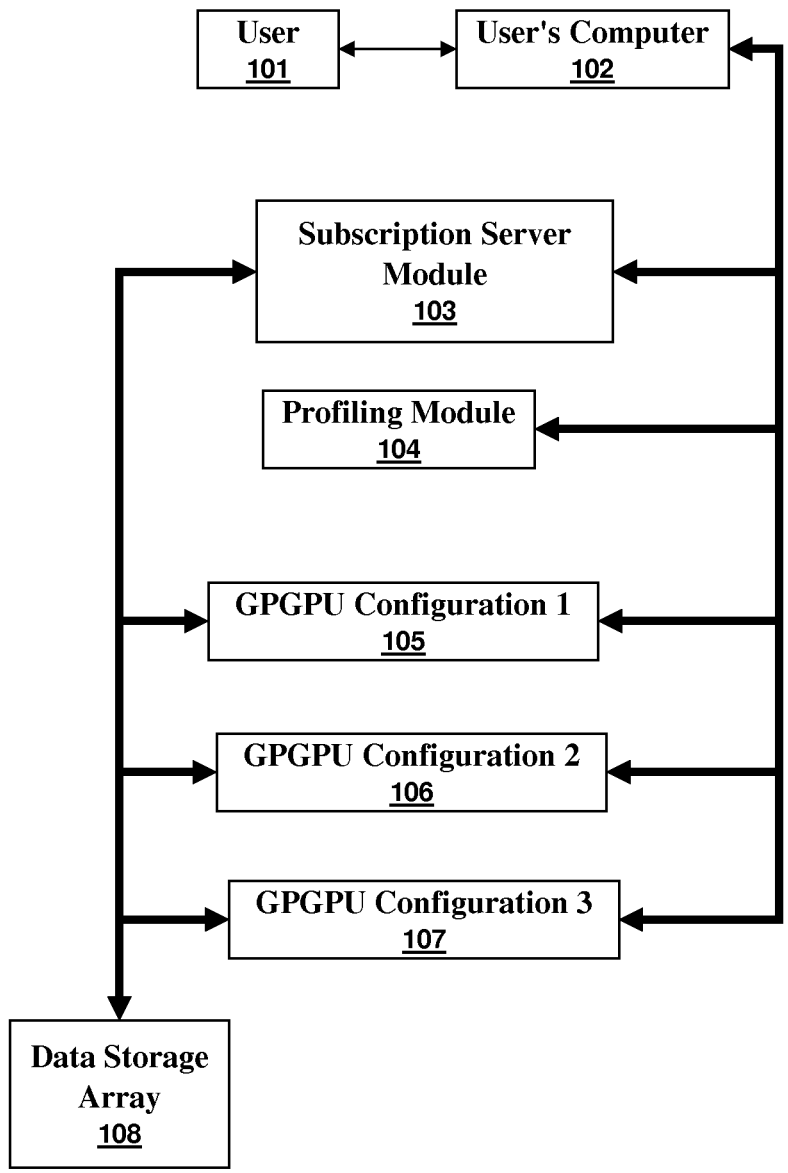
FIG. 1 illustrates a subscription based service by which a user can test an algorithm, application, or utility upon a number of different GPGPU configurations in accordance with aspects of the embodiments.

FIG. 1 illustrates a subscription based service by which a user 101 can test an algorithm, application, or utility upon a number of different GPGPU configurations 105, 106, 107. The user 101 can access the user's computer 102 to develop, compile, etc a GPGPU application. A service provider can provide the user with access to a number of different GPGPU configurations such as GPGPU configuration 1 105, GPGPU configuration 2 106, and GPGPU configuration 3 107. The user 101 can download the application to a suitably configured GPGPU cluster and run it. A data storage array 108 can store data for the user such that the data is available to the user's application. A profiling module 104 can track the number of processors, amount of processing time, amount of memory, and other resources utilized by the application and report those utilizations back to the user.

The user's computer 102 connects to the service using a communications network. As illustrated, a second communications network can interconnect the configurations, modules, and data storage array 108. For example, the user's computer might over the internet whereas the GPGPU cluster communicates internally using infiniband or some other very high speed interconnect. The various networks must also include network hardware as required (not shown) such as routers and switches.

A subscription module 103 can control the user's access to the GPGPU configurations such that only certain users have access. The subscription module 103 can also limit the amount of resources consumed by the user such as how much data can be stored in the data storage array 108 or how much total GPU time can be consumed by the user. Alternatively, the subscription module can track the user's resource consumption such that the user 101 can be invoiced after the fact or on a pay-as-you-go basis.

The user's application can include a specification of the GPGPU cluster configuration. In this case, the user can produce multiple applications that are substantially similar with the exception that each specifies a different configuration. Testing and profiling the different applications provides the user with information leading to the selection of a preferred GPGPU cluster configuration for running the application. As such, the cluster configuration can be tuned to run an application such as a molecular dynamics simulator. Alternatively, the application can be tuned for the configuration.

A service provider can provide access to a number of different cluster configurations. A user accessing the service can submit an application that is then run and profiled on each of the available configurations or on a subset of the available configurations. This embodiment eases the users burden of generating numerous cluster configuration specifications because those specifications are available from the service provider.

Figure 2:
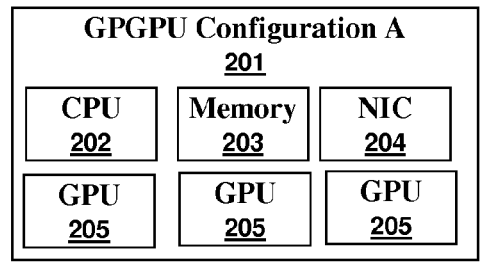
FIG. 2 illustrates one possible GPGPU configuration units in accordance with aspects of the embodiments.

FIG. 2 illustrates one possible GPGPU configuration. GPGPU configuration A 201 has a CPU 202, memory 203, a network interface 204, and three GPUs 205. In GPGPU configuration A 201 a single computer holds all the processing capability. Note that GPGPU configuration A 201 can be deployed as a unit within a much larger configuration that contains numerous computers. However, should GPGPU configuration A encompass all of the available resources then the subscription server module and the profiling module can run as application programs on the single computer.

Figure 3:
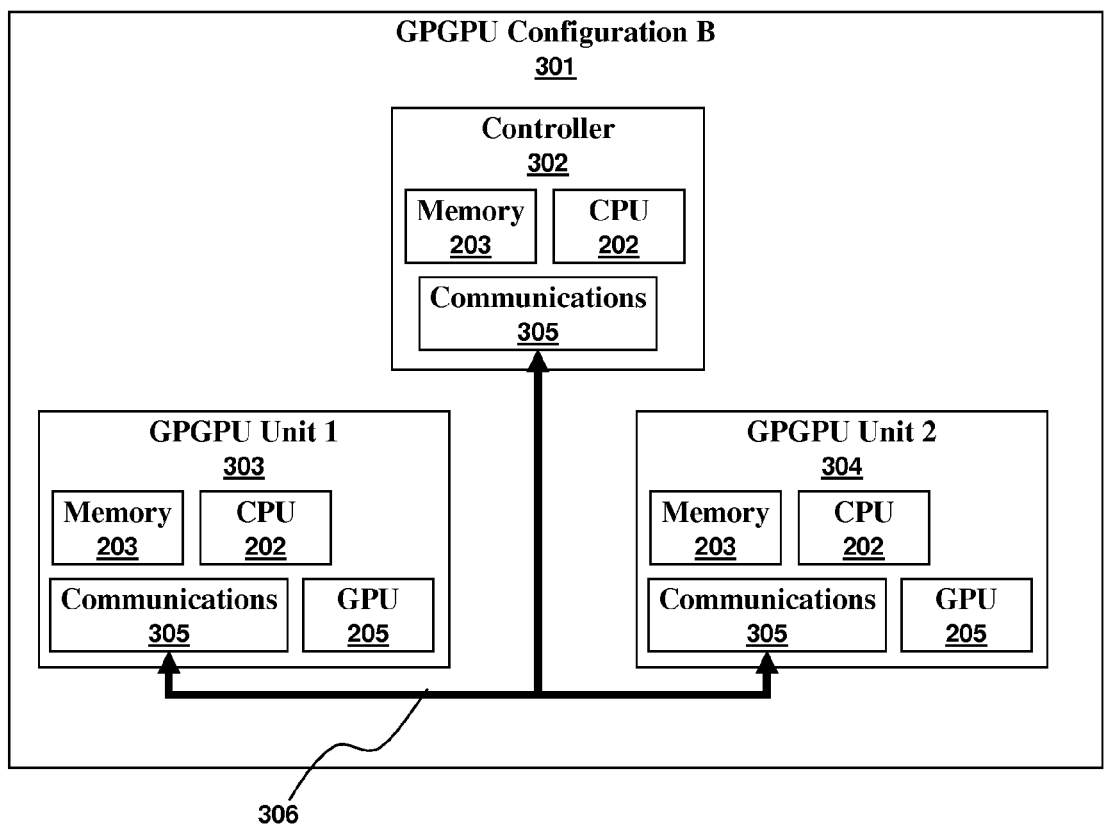
FIG. 3 illustrates a GPGPU configuration having GPGPU units in accordance with aspects of the embodiments.

FIG. 3 illustrates a GPGPU configuration having numerous GPGPU units. GPGPU configuration B 301 has a control computer 301, GPGPU unit 1 303 and GPGPU unit 2 304 interconnected by a communications network 306. Note that each of the GPGPU units has a single GPU 205 and the control computer 302 has none. As such, this is a non limiting example because a controller can contain multiple GPUs as can each of the GPGPU units. The communications network can be a single technology such as infiniband or Ethernet. Alternatively, the communications network can be a combination of technologies. In any case, the communications module 305 in each computer has the hardware, firmware, and software required for operation with the communications network 306. The control computer 302 can run the subscription server module and the profiling module as application programs.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A GPGPU cluster computing service comprising:
a subscription server module communicating with a user's computer and controlling a user's access to the GPGPU cluster computing service;
a plurality of GPGPU units each comprising an enclosure, a cooling fan, a CPU, system memory, GPU memory, a GPU, and a communications interface, wherein each GPU on the plurality of GPGPU units is accessible by the user computer subject to permission determined by the subscription server;
a GPGPU application created by a user on the user's computer to include a specification for the GPGPU cluster configuration, the GPGPU application received by the plurality of GPGPU units from the user's computer, the GPGPU application configured to be run by the plurality of GPGPU units to produce application results based on the user created specification wherein the GPGPU units are interconnected in accordance with a first configuration, wherein the GPGPU application comprises GPU instructions that are performed by the GPUs, and wherein the GPGPU application comprises application data that is operated on by the GPU instructions;
a second GPGPU application created by a user on the user's computer to include a second specification for the GPGPU cluster configuration, the second GPGPU application designed to also produce the application results using the second specification but wherein the GPGPU units are interconnected in accordance with a second configuration such that the user receives secondary resource utilization information to thereby guide the user to selecting a preferred configuration, wherein the user can test and profile the first GPGPU application and the second GPGPU application; and a profiling module that tracks the GPGPU application's resource utilization during run time such that the user receives resource utilization information.

2. GPGPU cluster computing service of claim 1 further comprising a data storage array in communication with the GPGPU units wherein the user stores the application data in the data storage array for later use by the GPGPU units.

3. GPGPU cluster computing service of claim 1 wherein the subscription server module receives the resource utilization information from the profiling module and limits the user's consumption of resources.

4. GPGPU cluster computing service of claim 1 wherein the subscription server module receives the resource utilization information such that the user is invoiced.

5. GPGPU cluster computing service of claim 1 further comprising a controller comprising an enclosure, a CPU, memory, and a communications interface and wherein the subscription server module is a computer program running on the controller.

6. GPGPU cluster computing service of claim 5 wherein the profiling module is a computer program running on the controller.

7. GPGPU cluster computing service of claim 1 further comprising a controller comprising an enclosure, a CPU, memory, and a communications interface and wherein the profiling module is a computer program running on the controller.

8. A GPGPU cluster computing service comprising:
a subscription server module communicating with a user's computer and controlling a user's access to the GPGPU cluster computing service;
a plurality of GPGPU units each comprising and enclosure, a cooling fan, a CPU, system memory, GPU memory, a GPU, and a communications interface, wherein each GPU on the plurality of GPGPU units is accessible by the user computer subject to permission determined by the subscription server;
a first GPGPU application created by a user on the user's computer to include a specification for the GPGPU cluster configuration, the first GPGPU application received by the plurality of GPGPU units from the user's computer, the first GPGPU application configured to be run by the GPGPU units to produce application results based on the user created specification wherein the GPGPU units are interconnected in accordance with a first configuration, wherein the first GPGPU application comprises GPU instructions that are performed by the GPUs, and wherein the first GPGPU application comprises application data that is operated on by the GPU instructions;
a profiling module that tracks the first GPGPU application's resource utilization during run time such that the user receives primary resource utilization information;
a second GPGPU application created by a user on the user's computer to include a second specification for the GPGPU cluster configuration, the second GPGPU application received by the plurality of GPGPU units from the user's computer, the second GPGPU application designed to also produce the application results using the second specification but wherein the GPGPU units are interconnected in accordance with a second configuration such that the user receives secondary resource utilization information to thereby guide the user to test and profile the first GPGPU application and the second GPGPU application to select a preferred configuration.

9. GPGPU cluster computing service of claim 8 further comprising a data storage array in communication with the GPGPU units wherein the user stores the application data in the data storage array for later use by the GPGPU units and wherein both the first GPGPU application and the second GPGPU application use the application data.

10. GPGPU cluster computing service of claim 9 wherein the subscription server module receives the resource utilization information such that the user is invoiced accordingly.

11. GPGPU cluster computing service of claim 10 further comprising a controller comprising an enclosure, a CPU, memory, and a communications interface and wherein the subscription server module is a computer program running on the controller.

12. GPGPU cluster computing service of claim 11 wherein the profiling module is a computer program running on the controller.

13. GPGPU cluster computing service of claim 11 further comprising a controller comprising an enclosure, a CPU, memory, and a communications interface and wherein the profiling module is a computer program running on the controller.

14. GPGPU cluster computing service of claim 9 wherein the subscription server module receives the resource utilization information and limits the user's consumption of resources.

15. GPGPU cluster computing service of claim 10 further comprising a controller comprising an enclosure, a CPU, memory, and a communications interface and wherein the controller processes at least a portion of the application data in accordance with the second configuration.

16. GPGPU cluster computing service of claim 15 wherein the controller further comprises GPU memory and a GPU that process at least a portion of the application data.

* * * * *